United States Patent [19]

Lewis

[11] 3,713,574
[45] Jan. 30, 1973

[54] PRESS TOOL ASSEMBLIES

[75] Inventor: David Lewis, Ryton-on-Dunsmore, England

[73] Assignee: Chrysler United Kingdom Limited, London, England

[22] Filed: July 30, 1970

[21] Appl. No.: 59,724

[30] Foreign Application Priority Data

Aug. 13, 1969 Great Britain.................40,372/69

[52] U.S. Cl. ...................228/3, 29/200, 72/391, 72/452, 100/291
[51] Int. Cl. ...........................................B23k 21/00
[58] Field of Search ..........228/3, 4, 44; 29/26, 200; 100/291; 72/391, 452; 269/287

[56] References Cited

UNITED STATES PATENTS

| 2,920,511 | 1/1960 | Johnson | 228/3 |
| 2,909,951 | 10/1959 | Roznuis et al. | 228/3 |
| 2,891,430 | 6/1959 | Johnson | 228/3 |
| 2,863,344 | 12/1958 | Barnes | 228/3 |
| 2,204,151 | 6/1940 | Rodefer et al. | 100/291 X |
| 3,363,445 | 1/1968 | Sanders et al. | 72/391 |

Primary Examiner—Robert D. Baldwin
Assistant Examiner—Robert J. Craig
Attorney—Mawhinney & Mawhinney

[57] ABSTRACT

A press tool assembly comprises a tool holder for mounting on a press mechanism at one end with an axis of the holder extending in the direction of operation of the press mechanism and a plurality of tools mounted at the other end for radial movement towards and away from the axis of the holder.

8 Claims, 4 Drawing Figures

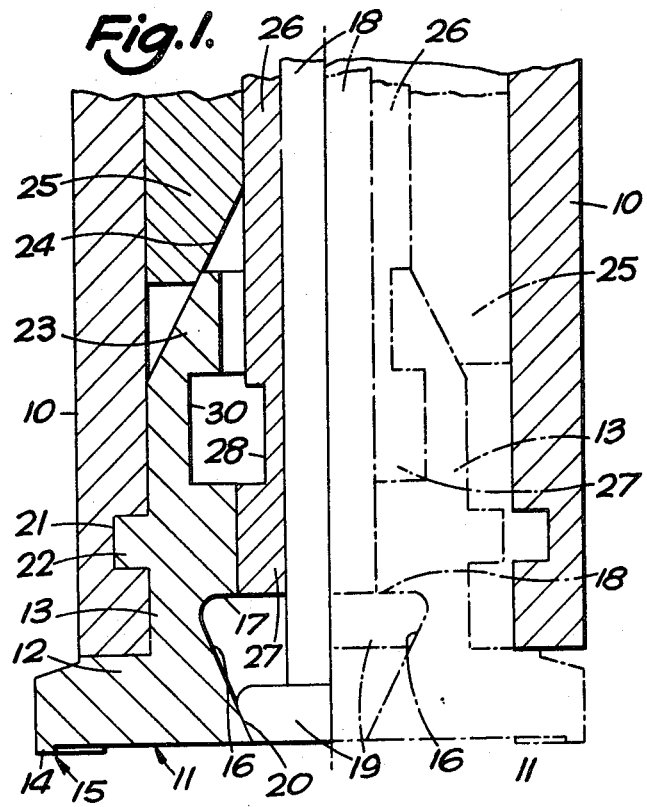
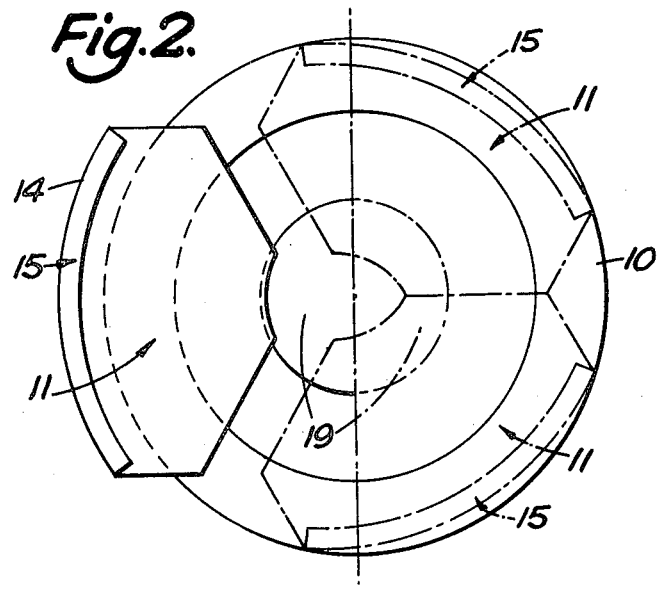

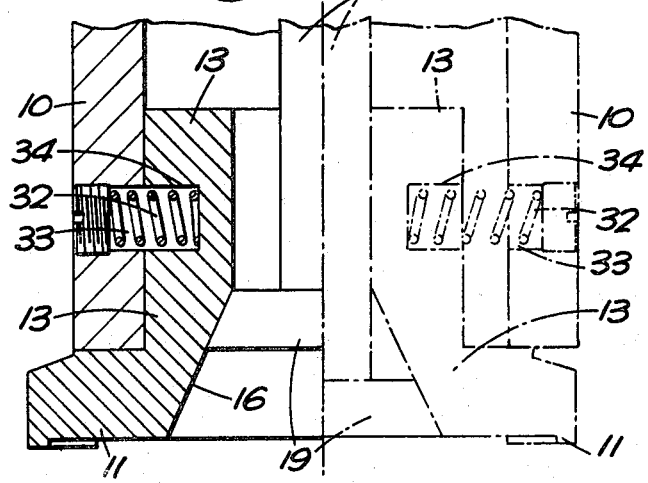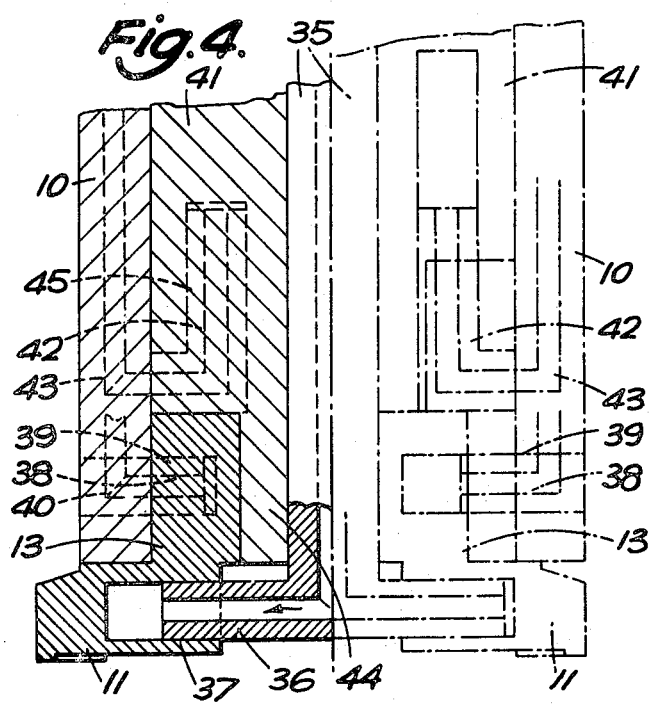

PRESS TOOL ASSEMBLIES

This invention relates to press tool assemblies for use in press mechanisms and is particularly although not exclusively to press tool assemblies for use in press mechanisms and is particularly although not exclusively to press tool assemblies for cold welding.

The invention provides a press tool assembly comprising a tool holder for mounting in a press mechanism with an axis of the holder extending in the direction of operation of the press mechanism, at least one tool having a surface for operating on a work piece which tool is mounted on the holder for radial movement with respect to said axis of the holder and means for moving the tool towards and away from the axis.

It will be appreciated that the above arrangement is particularly applicable where a press tool assembly has to be inserted through an opening to reach a workpiece to be operated on which lies beyond and outwardly of the opening.

A plurality of tools may be provided on the tool holder which tools are mounted on the holder for movement radially of said axis of the holder and means are provided for moving the tools towards and away from said axis. The or each tool may be moved outwardly of the axis of the holder by a cam which is movably mounted in the holder and which engages the or each tool.

The or each tool may be moved towards the axis of the holder by a further cam which is movably mounted in the holder and which engages the or each tool.

Spring means may be provided between the or each tool for urging the or each tool towards the axis of the holder.

Fluid rams may be provided between the or each tool and the holder for moving the or each tool towards and away from the axis of the holder.

A releaseable locking member may be provided in the holder for holding the or each tool in an outer position with respect to said axis.

The tool holder may comprise a hollow cylindrical body and the or each tool may comprise an arcuate segment which engages one end of the body on one side thereof and is formed with said surface for operating on the workpiece on the other side thereof.

The following is a description of three embodiments of the invention reference being made to the accompanying drawings in which:

FIG. 1 is a diagrammatic view of a tool holder and tools for use in a press mechanism;

FIG. 2 is an underplan view of the tool holder and tools shown in FIG. 1;

FIG. 3 is a diagrammatic view of another form of tool holder and tools; and

FIG. 4 is a diagrammatic view of yet a further form of tool holder and tools.

Referring firstly to FIG. 1 of the drawings there is shown the lower part of a tool holder which comprises a hollow cylindrical body 10 which is secured at its upper end to an upper platen (not shown) of a press mechanism.

Located at the lower end of the body 10 are three circumferentially spaced press tools indicated at 11. Each press tool comprises an annular segment 12 the upper face of which abuts the lower end of the body 10 and a limb 13 formed at the inner periphery of the segment which projects axially into the body 10. At the outer periphery of the segment 12 on the opposite side to the body 10 there is an annular rim 14 the lower face 15 of which provides the working surface of the tool.

The inner periphery of each tool is cut away to provide a surface 16 which is inclined with respect to the axis of the sleeve. A rod 18 is axially movable along the body by means (not shown). The lower end of the rod 18 carries a cam 19 the outer peripheral surface 20 of which is tapered towards the lower end of the head and engages the inclined surface 16. Downward movement of the rod 18 to the position shown in full line on the left hand part of the Figure causes the head 19 to displace the tool radially outwardly to bring the outer peripheral part of the segment 12 having the working face 15 beyond the side wall of the body 10.

Upward movement of the rod 18 permits the tool to return to the inner position shown in dotted line on the right hand part of the Figure.

Adjacent the lower end of the body 10 there is an annular recess 21 on the inner periphery of the body in which a projecting tongue 22 on the limb 13 of the tool engages when the tool is moved into the outer position. Engagement of the tongue in the recess prevents canting of the tool with respect to the body during a pressing operation. The outer periphery of each upper limb 13 is formed with an inclined face 23 which engages a tapered bore 24 of a cam sleeve 25 which is axially movable within the sleeve 10. Downward movement of the sleeve 25 causes the tools 11 to be moved inwardly from the outer position shown in the left hand part of the Figure to the inner position shown in dotted lines in the right hand part of the Figure.

The rod 18 is encircled by a further sleeve 26 which has means (not shown) for moving the further sleeve axially of the body. The lower end of the sleeve 26 is formed with an enlarged head 27 adjacent which there is an annular recess 28. The sleeve is shown in the lower limit of its travel on the left hand part of FIG. 1 and the outer periphery of the head 27 is in engagement with the inner periphery of the tool thus holding the tool in its outer limit of radial movement. The limb 13 of the tool is recessed as indicated at 30 immediately above the location engaged by the head 27 to receive the head when the sleeve 26 is at the upper limit of its travel and the tool is at its inner position. In this position the recess 28 in the sleeve receives the upper inner peripheral part of the limb 13.

The arrangement described is particularly suitable in cases where access to faces which require to be pressed together e.g. for cold welding, can only be obtained through an opening which is smaller in diameter than the faces.

It will be appreciated that an annular cold weld is formed by carrying out one pressing operation using the press tool and then rotating the work relatively to the tool and carrying out a further pressing operation or operations at locations which may overlap the locations of the first pressing operation.

Referring now to FIG. 3 of the drawings there is shown a similar arrangement to that described above except that the face 16 on each tool is of opposite inclination and the outer periphery of the head 19 on the rod 18 is also of opposite inclination. Also the tools 11 are moved radially inwardly with respect to the sleeve by heavy compression springs 32 extending between oppositely spaced recesses 33 and 34 in the body 10 and the limb 13 of the tool respectively. The cam sleeve 26 is omitted.

Referring now to FIG. 4 of the drawings there is shown an arrangement in which the tool holders are moved inwardly and outwardly pneumatically. Instead of the rod 18 there is provided an axially extending conduit 35 which divides into three radially extending conduits 36 at its lower end for the three tools respectively. The radially extending conduits 36 extend into radially extending cylinders 37 formed in the tools 11. Air pressure supplied through the conduit 35 under the control of appropriate valves (not shown) causes the tool 11 to be moved outwardly to the position shown on the left hand part of FIG. 4. Adjacent the lower end of the body 10 there are formed radially inwardly extending conduits 38 which project into cylinders 39 formed in the limbs 13 of the tool. The conduits are connected through conduits 40 to valves (not shown) for controlling air supply. Air pressure supplied to the conduits 38 causes the limbs of the tool holders to be displaced radially inwardly of the sleeve.

A stepped sleeve 41 is slidably located in the body 10 with the reduced diameter part 44 of the sleeve lowermost. Two conduits 42 extend inwardly from the wall of the body at spaced locations and are cranked upwardly into bores 45 in the sleeve which extend upwardly from the step. Air is supplied to the conduits 42 through bores 43 in the wall of the body 10.

In the lower position of the sleeve shown on the left hand part of the Figure, the reduced diameter portion 44 engages between the press tools 11 to hold the tools in their outer positions. The sleeve 41 falls into this position when the tools have been moved outwardly. The sleeve 41 is raised to the position shown in the right hand part of the Figure by supplying air under pressure to the conduits 42 and the tools 11 can then be moved to their inner positions.

I claim:

1. A press tool assembly for use in a reciprocating press, the assembly comprising an elongated tool holder having an outer side wall and opposing ends and having a central axis extending through said ends, at least one press tool mounted at one of said ends for movement transverse to said central axis and having an outer working surface, means for mounting the press tool in the holder for movement between an operative outer position in which the tool is projected radially outwardly from the holder with respect to the central axis and the working surface of said tool is disposed radially outwardly of the outer side wall of the holder and an inoperative inner position in which the working surface of the press tool is disposed adjacent the outer side wall of the holder and the tool is positioned inwardly of the holder with respect to the central axis and means for moving the tool from said operative to inoperative positions.

2. A press tool assembly as claimed in claim 1 wherein a plurality of said press tools are provided on the tool holder at locations spaced around said central axis and means are provided for moving all the tools between operative positions in which the tools project radially outwardly of the outer side wall of the holder and inoperative positions in which the tools lie radially inwardly of said side wall.

3. A press tool assembly as claimed in claim 1 wherein the means for moving the press tool from the inoperative to the operative position comprise a cam which is movably mounted in the holder and which acts on the tool.

4. A press tool assembly as claimed in claim 3 wherein the means for moving the press tool from the operative to the inoperative position comprise a further cam which is movably mounted in the holder and which acts on the tool.

5. A press tool assembly as claimed in claim 3 wherein the means for moving the press tool from the operative to the inoperative position comprise spring means between the tool and holder for urging the tool towards the axis of the holder.

6. A press tool assembly as claimed in claim 1 wherein the means for moving the tool between operative and inoperative positions comprise fluid rams acting between the tool and the holder for moving the tool towards and away from the axis of the holder.

7. A press tool assembly as claimed in claim 1 wherein a releasable locking member is provided in the holder for holding the tool in the operative position.

8. A press tool assembly as claimed in claim 1 wherein said tool holder is cylindrical and a plurality of segmental shaped press tools are provided, said segmental press tools when in the inoperative inner position forming a circular body complemental to the cylindrical holder.

* * * * *